(12) United States Patent
Li et al.

(10) Patent No.: US 7,839,902 B2
(45) Date of Patent: Nov. 23, 2010

(54) FIBRE LASER SYSTEM

(75) Inventors: Cheng Li, Rugby (GB); Iain Botheroyd, Rugby (GB); Steffan Lewis, Reading (GB); Glyn Edwards, Daventry (GB); Stephen Keen, Leamington Spa (GB)

(73) Assignee: GSI Group Ltd., Rugby (GB)

( * ) Notice: Subject to any disclaimer, the term of this patent is extended or adjusted under 35 U.S.C. 154(b) by 156 days.

(21) Appl. No.: 12/341,314

(22) Filed: Dec. 22, 2008

(65) Prior Publication Data

US 2009/0175301 A1    Jul. 9, 2009

Related U.S. Application Data

(63) Continuation of application No. PCT/GB2007/050335, filed on Jun. 14, 2007.

(51) Int. Cl.
H01S 3/30    (2006.01)

(52) U.S. Cl. .............................. 372/6; 385/31

(58) Field of Classification Search ............ 385/31; 372/22, 6, 39; 359/333
See application file for complete search history.

(56) References Cited

U.S. PATENT DOCUMENTS

| | | | | |
|---|---|---|---|---|
| 4,782,491 | A * | 11/1988 | Snitzer | 372/6 |
| 6,434,302 | B1 * | 8/2002 | Fidric et al. | 385/43 |
| 6,836,607 | B2 * | 12/2004 | Dejneka et al. | 385/126 |
| 7,649,914 | B2 * | 1/2010 | Lewis | 372/6 |
| 2001/0017971 | A1 | 8/2001 | Iwata et al. | |
| 2004/0036955 | A1 | 2/2004 | Digonnet et al. | |
| 2004/0071409 | A1 | 4/2004 | Brown | |
| 2005/0025418 | A1 | 2/2005 | Brown | |
| 2005/0105854 | A1 | 5/2005 | Dong et al. | |

| | | |
|---|---|---|
| 2007/0041083 | A1 | 2/2007 Di Teodoro et al. |

FOREIGN PATENT DOCUMENTS

| | | |
|---|---|---|
| EP | 0353870 | 2/1990 |
| EP | 0353870 A | 2/1990 |
| EP | 1043815 A3 | 9/2003 |
| GB | 2068142 | 8/1981 |
| GB | 2439345 A | 8/1981 |
| GB | 2183360 | 6/1987 |
| GB | 2439345 A | 12/2007 |
| JP | 09211238 | 8/1997 |
| JP | 09211238 A | 8/1997 |

(Continued)

OTHER PUBLICATIONS

Berger, J et al. "Fibre-bundle Coupled, Diode End-pumped Nd:YAG Laser," Optic Letters, vol. 13 No. 4; Apr. 1988.

*Primary Examiner*—Minsun Harvey
*Assistant Examiner*—Tuan N. Nguyen
(74) *Attorney, Agent, or Firm*—Gauthier & Connors LLP (57) ABSTRACT

A fibre laser system is disclosed comprising an optical fibre, a part of which is doped with a rare earth to form an optical gain medium; at least one laser diode; means for applying pump radiation from the laser diode to the optical gain medium and for generating a laser beam and delivery fibre means for delivering a laser beam to a workpiece, wherein the fibre laser is provided with at least one means for protecting one or more components from damage caused by errant radiation. Several different means of protection are disclosed.

26 Claims, 10 Drawing Sheets

FOREIGN PATENT DOCUMENTS

| | | |
|---|---|---|
| WO | 98/01784 | 1/1998 |
| WO | 9801784 A | 1/1998 |
| WO | WO99/30391 A1 | 6/1999 |
| WO | 2005/029146 | 3/2005 |
| WO | 2005029146 A | 3/2005 |
| WO | 2007/039893 | 4/2007 |
| WO | 2007039893 A | 4/2007 |
| WO | 2008/119340 | 10/2008 |
| WO | 2008119340 A | 10/2008 |

\* cited by examiner

FIBRE LASER SYSTEM

This invention relates to a fibre laser system.

In particular, it relates to a fibre laser system having high damage resistance and which is immune or substantially immune from feedback from a material processing operation. The material processing operation may be cutting, welding or any other processing operation.

BACKGROUND OF THE INVENTION

Cladding pumped fibre lasers are becoming more common. In these types of lasers, a core of an optical fibre is doped with a rare earth element to become an active gain medium and pump radiation is applied via a cladding layer. The pump radiation is normally produced by semi-conductor laser diodes and a means is provided for coupling their input into the cladding of the rare earth doped fibre. Bragg gratings formed in the core of the optical fibre are employed as mirrors to form a laser cavity.

Co-pending UK Patent Applications Nos 0612463.0 and 0623452.0 describe schemes for coupling pump radiation into or out of an optical fibre and a cladding pumped fibre laser having a high degree of pump isolation. These disclosures are incorporated herein by reference.

Conventional lamp pump non-fibre lasers can be protected in various ways against back radiation and other types of damage. This is more difficult with fibre lasers.

Material processing a highly reflective material such as copper can result in a large amount, perhaps even up to 90% or so, of the power being reflected if the incident pump light is not coupled into the material properly. This may come as a result of the incident laser beam not having sufficient intensity either through lack of power or the laser output being out of focus. This reflected power can have serious consequences for the laser source if it is not controlled properly, either through damage of the delivery fibre and surrounding optics or delivery feedback into the source laser causing it to run unstably or causing the light to damage the sensitive pumped diodes. It will be recalled that pumping radiation from the diodes is applied through a cladding layer to the doped region and therefore any reflected radiation which finds its way back into the cladding layer could, in an unprotected system, find its way directly to the pump diodes where it can severely damage them.

Furthermore, it is well know (Optics letters Vol 13 No 9) that an optical fibre carrying only modest amounts of power densities can experience a process referred to as 'the optical fuse effect'. The effect is initiated by a defect in the carrying optical fibre such as damage to an end face or core of the delivery fibre. The defect in the optical fibre creates a region of high absorption which can raise the core to above 1000 C and a plasma is created in the core. This plasma will propagate towards the source of radiation, destroying the core of the delivery fibre at a subsonic velocity. This propagation will continue until either the operation of the source of radiation is destroyed or there is an increase in the mode field diameter which reduces the intensity of both the optical signal and pressure wave, arresting the propagation of the optical discharge. This uncontrolled propagation of the optical discharge can propagate into vital components of the fibre laser resulting in its destruction.

The present invention arose in attempt to design a fibre laser system that is highly resistant to damage and is robust.

A further object of the invention is to provide a fibre laser system that includes electronic means for protecting the laser from damage caused by the optical fuse effect, such that operation of the laser can be restored by a simple process.

SUMMARY OF THE INVENTION

In a first aspect, according to the invention, there is provided a fibre laser system comprising an optical fibre, a part of which is doped with a rare earth to form an optical gain medium; at least one laser diode; means for applying pump radiation from the laser diode to the optical gain medium and for generating a laser beam and delivery fibre means for delivering a laser beam to a workpiece, wherein the fibre laser is provided with at least one means for protecting one or more components from damage caused by errant radiation.

Errant radiation in this context comprises any errant radiation that is reflected back from a workpiece or other radiation which might damage any components of the system, including the fibre itself or the pump diodes.

Preferably, the fibre laser includes a fibre termination, at an output end, which is arranged to enable expansion of a laser beam, before it is launched, to thereby reduce power intensity at the point of launch. This may include a capillary mounted at the output end and having a face, at its end closest to the active gain medium, which is angled to have an angle greater than 0° but less than 90° to the axial direction of the fibre, preferably at an angle of 40° to 60° and preferably at an angle of between 45° and 50°, typically 49°.

An end cap may be fused onto the capillary and this may have a diameter smaller than the capillary and be mounted inside the bore of the capillary, or have a diameter approximately equal to or greater than the diameter of the capillary and be fused onto the end of the capillary.

The fibre may be provided with a means for protecting against errant radiation as described in co-pending Patent Application No 0623452.0. It may comprise a waveguide optically coupled to the at least one diode so as to receive pump radiation, the waveguide having a core, at least a portion thereof being rare-earth doped to provide the gain medium, and also having at least three claddings to confine stray radiation originating in the waveguide system, to guide the radiation, and to cause the radiation to exit the system along a path that avoids impingement upon the at least one diode.

Alternatively, the fibre may have at least three cladding layers and the system include, including at least one intermediate cladding layer; at least one multimode laser diode to pump the doped optical fibre gain medium with pump radiation; a multiplexor for guiding a laser signal along a direction, for receiving and guiding pump radiation from the at least one pump diode, and for delivering the laser signal and pump radiation to the doped optical fibre; wherein a fraction of stray radiation that originates within the system is captured with the (at least one) intermediate cladding layer of the rare-earth-doped fibre; and wherein the stray radiation is guided through the multiplexor in an intermediate cladding layer.

Preferably, the fibre laser system may also comprise one or more cladding mode strippers arrange to strip the cladding mode from the delivery fibre.

Preferably, the system may further alternatively comprise one or more power monitors arranged to detect forward propagating power or other characteristics. Preferably, two or more monitors are provided, one monitoring power nearer the beam delivery output end of the system then the other or others to provide a means of measuring power continuity through the delivery fibres. The power detectors are spaced apart so that any standard electronic circuitry will be able to respond in time and switch off the excitation source of the fibre laser before damage is incurred by critical components.

Alternatively one power monitor may be used, in the output leg and the fault condition detected by comparing the output of the power monitor with a predictive power as forecast by the drive level to the excitation source of the fibre laser.

The system may also comprise a triple clad gain/relay fibre. It may further comprise an annular pump combiner as described in co-pending Application No 0612463.0. This may be done by tapering a pump waveguide prior to introducing a signal feed through fibre (including the doped region) within the pump waveguide or by other methods so that once in place there is little or ideally no tapering of the signal feed through fibre, and which maintains the signal fibre in an annular disposition.

The fibre device may be constructed by providing a former; arranging a plurality of multi-mode pump fibres in a bundle around the former; fusing and taping down the pump fibre and former to any other diameter that is larger than the signal fibre to form a tapered annular waveguide; inserting the signal fibre into the tapered assembly and fusing the taper assembly onto the signal fibre.

Alternatively, by providing a multi-bore capillary having a central bore sufficiently large to accommodate the signal feed through fibre and a plurality of bores intended to accommodate the multi-mode pump fibres running along its length, inserting the pump fibres into the pump bores and fusing the pump fibres into the multi-bore capillary.

In one embodiment, the fibre may comprise an output optical fibre, a substantially untapered feed through optical fibre; an annular waveguide having a tapered section; and a plurality of multi-mode pump fibres such that the signal feed through fibre is located within the annular waveguide, the signal feed through fibre is fused onto the annular waveguide in the tapered section so that the annular waveguide becomes an additional cladding layer of the feed through fibre, the over clad signal feed through fibre is optically coupled to the output optical fibre and the multi-mode pump fibres are optically coupled to the annular waveguide in the untapered section.

Other methods of forming an annular pump combiner are disclosed in GB 0612463.0 and may be used, or alternative methods may be used.

The invention also comprises a fibre laser system including any one or more of the novel features, or combinations of features, disclosed herein.

The invention also provides a termination for an optical fibre, including means for expanding the diameter of an optical signal transmitted by the fibre to a greater diameter than the diameter of the core of the fibre before it is launched into free space.

The termination may be used on optical fibres other than those used for fibre lasers.

DESCRIPTION OF THE DRAWINGS

Embodiments of the invention will now be described, by way of example only, with reference to the accompanying drawings, in which.

DESCRIPTION OF PREFERRED EMBODIMENTS OF THE INVENTION

Figure 1:
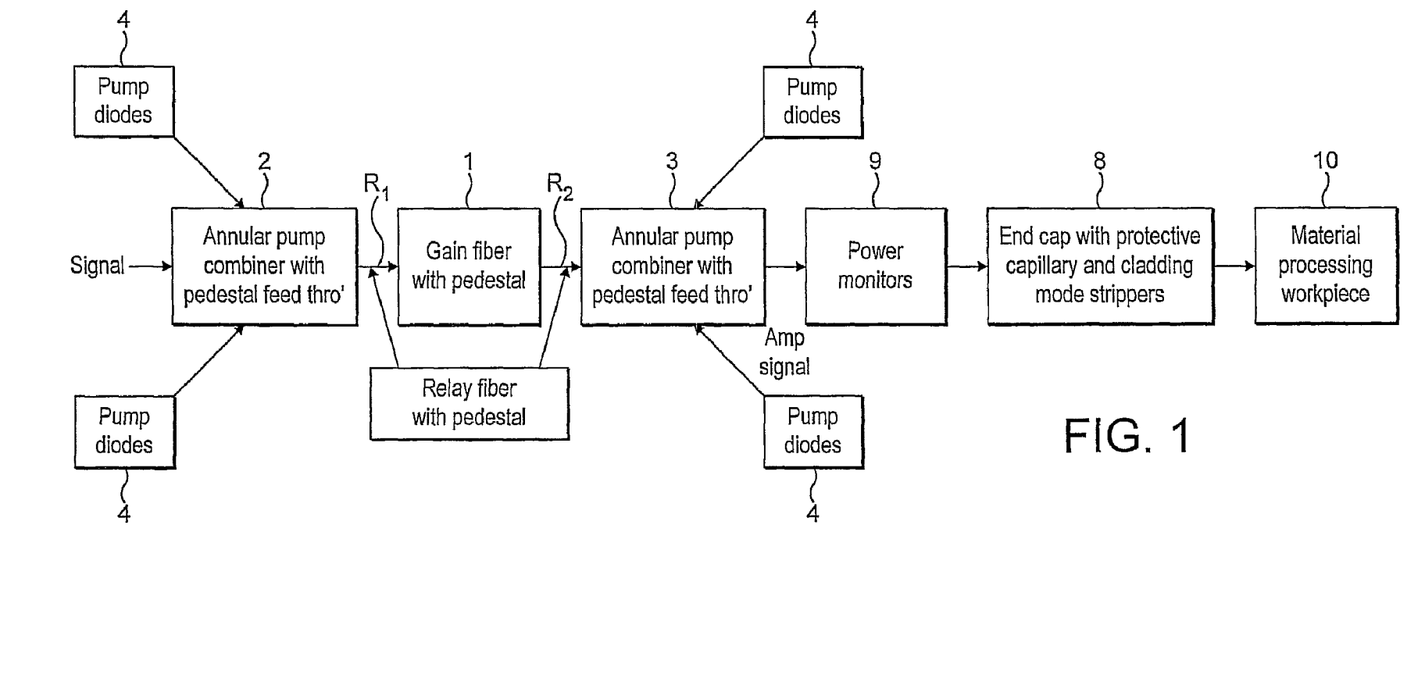
FIG. 1 shows a block diagram of components of a fibre laser system.

Referring to FIG. 1, a fibre laser system basically comprises a fibre portion 1 which is doped with a rare earth material to provide an active gain medium; a pump combiner 2, 3 at either end of the gain fibre; semi-conductor laser pumped diodes 4 whose output is applied through the pump combiner into the gain fibre; and relay fibre portions $R_1$, $R_2$ between the gain fibre and the respective pump combiners 2 and 3. The number of pump diodes may be chosen according to the nature of the laser and the particular application, there may be any number from one upwards. The gain fibre can be used in an amplifier configuration or as a laser by appropriate feedback. The laser energy is output over a delivery fibre 7 to a termination having an end cap with protective capillary and also one or more cladding mode strippers 8. One or more power monitoring stations 9 are used to monitor the power in the delivery fibre and to provide fault indications. The laser beam is launched from the end of the fibre with the end cap to process a workpiece 10. The processing may be cutting, welding, drilling, piercing or any other laser processing for which fibre lasers are useful.

Figure 2:
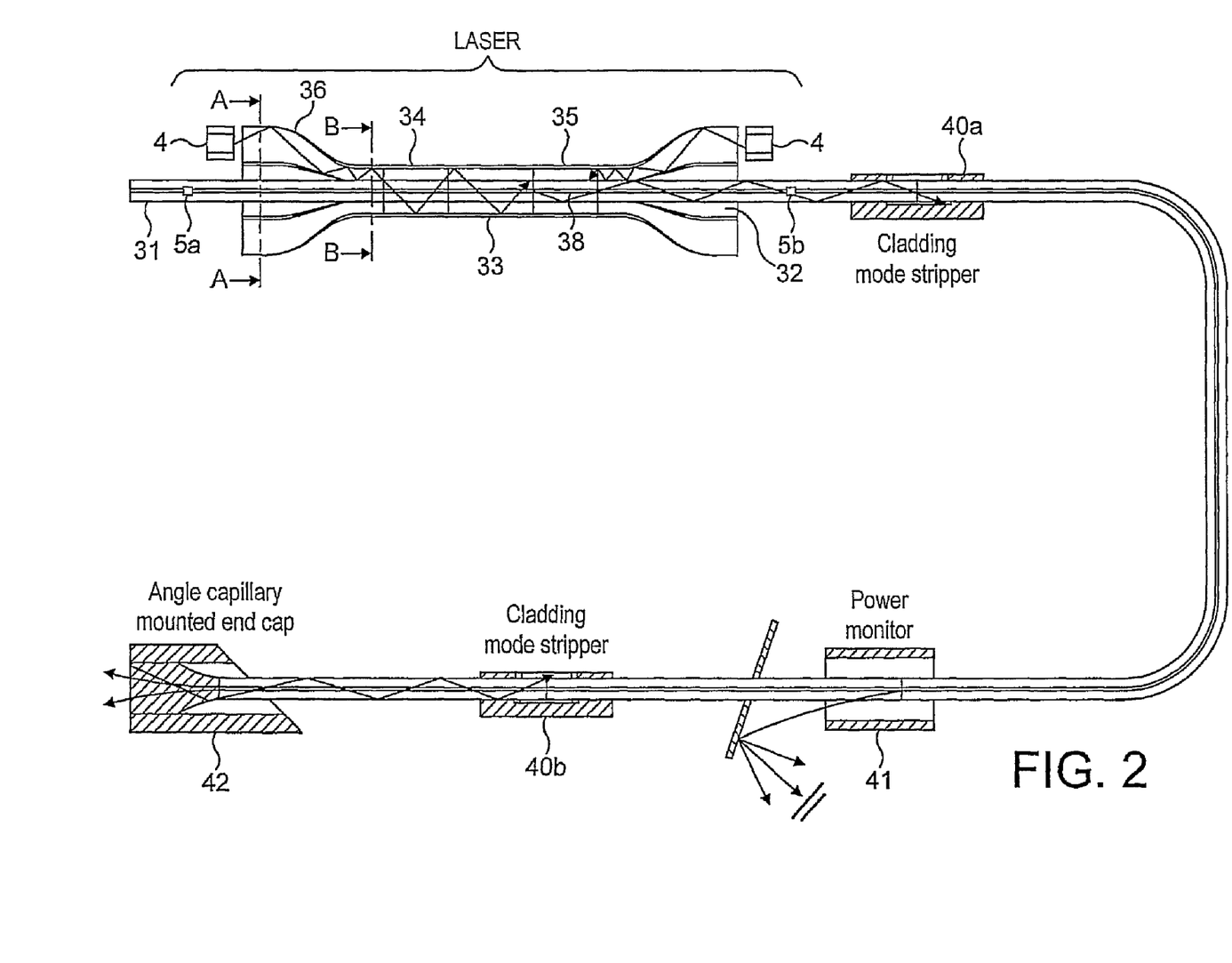
FIG. 2 shows an overall schematic diagram of a system.

FIG. 2 shows a fibre system in a little more detail. The gain fibre/pump combiner assembly is preferably formed by a method as described in co-pending UK Patent Application No 0612463.0 and described in more detail further below. These methods result in an annular pump combiner and gain fibre which represents a significant improvement and reduction in signal feed through loss in a conventional fused fibre pump and signal multiplexor by avoiding tapering of the signal fibre and fusion of pump and signal fibres.

The laser arrangement (ie gain fibre, relay fibre and/or annular pump combiner) also most preferably includes a triple-clad or multi-clad 'pedestal' arrangement as described in co-pending UK Patent Application No 0623452.0.

Figure 2A:
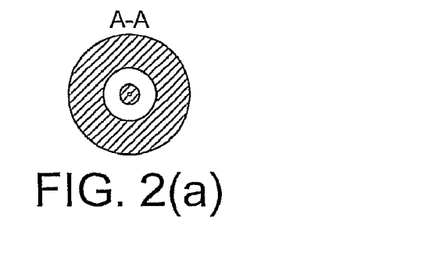
FIGS. 2(a) and 2(b) show cross-sections through A-A and B-B.
Figure 2B:
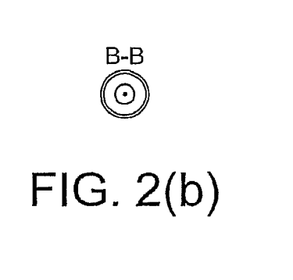

The laser comprises two un-doped signal feed through fibres 31, 32. A plurality of laser pump diodes 4, a length of rare-earth-doped triple clad optical fibre 33, two lengths of passive double clad relay fibre 34, 35 (which may be of any convenient length and might be up to several metres long) and a plurality of multi-mode pump delivery fibres 36 arranged in a bundle around the signal feed through fibre, or provide as a single annular pump combiner as shown in FIG. 2. FIG. 2(a) shows a section of the assembly along section A-A and FIG. 2(b) shows a section along B-B. A-A shows the annular pump fibre radially separated from the feed fibre and B-B shows them fused together nearer the doped area.

Figure 3:
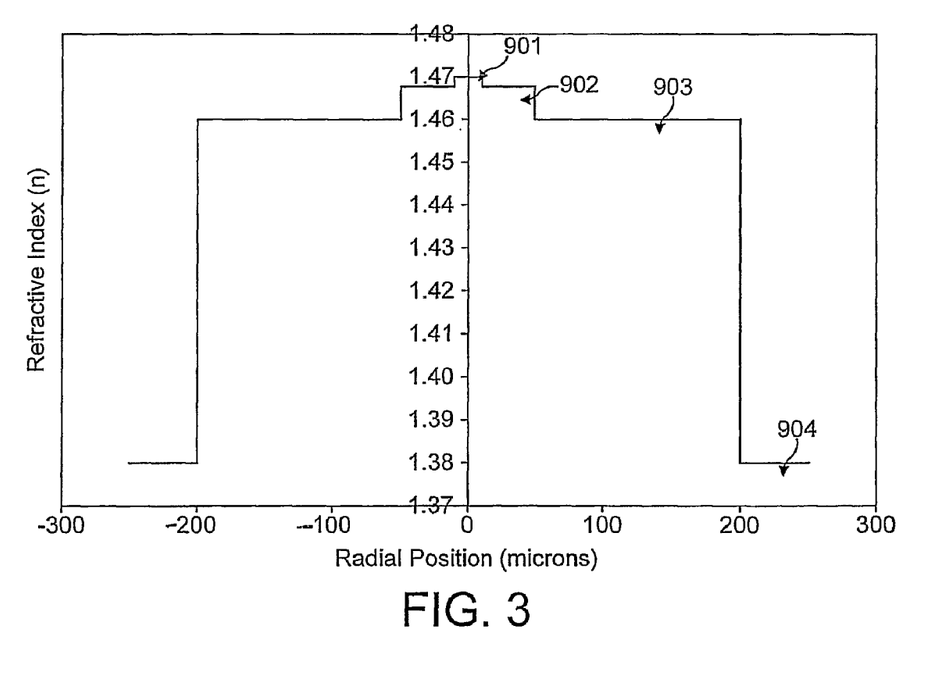
FIG. 3 shows refractive indices of layers of a fibre.

The pump delivery bundle is fused to the signal fibre by annular pump combining methods as described above so as receive inputs from the one or more diodes 4 and to apply this power through the cladding layer to the rare-earth-doped fibre. As is shown in FIG. 2, light emitted from each of the diodes 4 travels through the annular pump delivery fibres 36 and then passes through the cladding layers of the relay and doped fibres to pump the doped fibre. The fibre amplifier is provided with Bragg Gratings 5a and 5b to provide feedback and form a laser resonator. In an embodiment of the invention, the doped, relay and feed through fibres 31, 32, 33, 34 and 35 are provided with one or more additional cladding layers 38. They therefore have four distinct regions, a core, a first cladding (sometimes referred to as a 'quick pedestal'), a second cladding and a third cladding. If the refractive indices of these regions are denoted $N_1$, $N_2$, $N_3$ and $N_4$ then the refractive index decreases successively from layer to layer from the centre of the fibre and this is shown in FIG. 3 where 901 represents the core, 902 the first cladding layer, 903 the second cladding layer and 904 the third cladding layer. The numerical aperture (NA) of an interface is defined by the respective refractive indices $N_1$, $N_2$ of the materials either side of the interface. If the core has a numerical aperture $NA_{core}$ defined by $N_1$ and $N_2$, the first cladding has a numeral aperture $NA_{clad1}$ defined by $N_2$ and $N_3$ and the second cladding has a numeral aperture $NA_{clad2}$ defined by $N_3$ and $N_4$, the core, first and second cladding layers are of glass construction and the cladding layer consists of a lower refractive index polymer then, for example, values of the refractive numerical apertures might be $NA_{core}=0.07$, $NA_{clad1}=0.01$ and $NA_{clad2}=0.46$. Note that the cross-section of the second cladding layer might be shaped other than annularly, for example octagonal in some embodiments. The passive relay 5 might also have a similar refractive index profile to the doped fibre, as may the signal feed through fibre.

As is described in the co-pending UK patent application, the use of further cladding layers and providing a pedestal serves to confine stray signal lights to a region around the core and to prevent it from propagating back to the pump diodes. Thus, essentially, once light has found its way into the core, it cannot propagate back to the pump signal fibres 36 and therefore into diodes 4.

The pump delivery fibres 36 may also be provided with a pedestal by using a triple or more cladding structure.

After exiting the laser part itself, the fibre passes through a cladding mode stripper 40a, through one more power monitors 41 to a further cladding mode stripper 40b and end cap fibre termination 42 and is then transmitted to a workpiece for processing the workpiece.

The end cap 42 and also the cladding mode stripper 40 are intended to remove light in a controlled manner that is not directly imaged back into the core. Any back reflected light that does make it back into the core is kept away from the laser diodes through the use of a triple or multi-clad fibre and annular combiner structure. The triple or multiple clad fibre design also increases immunity of the laser diode from spikes in the output of the laser oscillator due to feedback.

Figure 4:
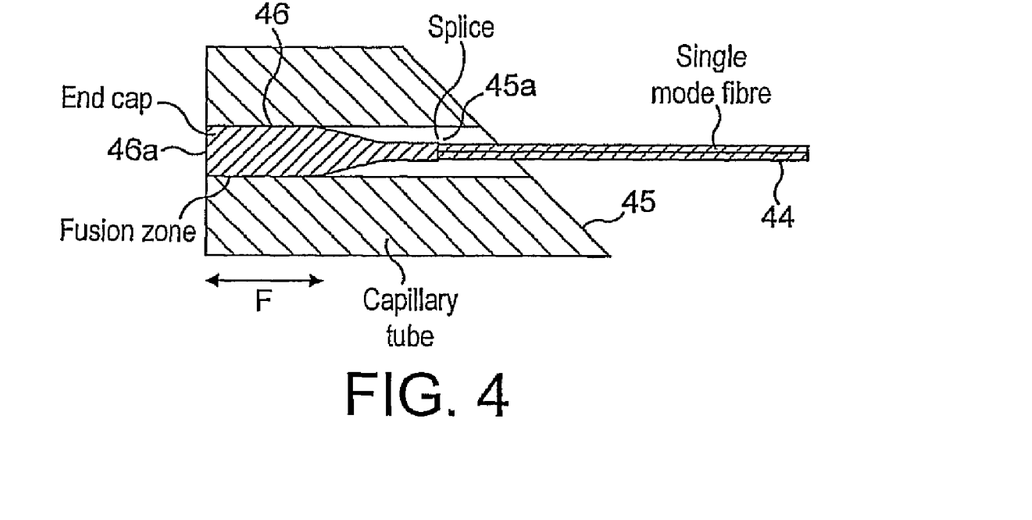
FIG. 4 shows an end cap.

An embodiment of an end cap design is shown in FIG. 4. The output of the beam delivery fibre (single mode fibre) 44 is terminated by a capillary 45 which may be cylindrical but preferably has a face (the face closest to where the laser beam is generated) which is angled ie at an angle other than 0° or 90° to the longitudinal axis of the fibre and typically around 45° to 50°, say 49°. This angled capillary serves to minimise back reflection.

A single mode fibre typically has a core diameter of around 10 microns or less. This means that the power density at the fibre face is very high even when operating at few hundred watts. To prevent damage to the end face, the beam is allowed to expand inside a silica end cap 46 which is fused onto the fibre end face 45a (at the splice point shown). The end cap 46, is also fused within the bore of a capillary tube, preferably so that its end lies flush with the end of the capillary (or the end cap/capillary may be cleared, polished or otherwise treated to form a flat end).

As described, the end cap allows the beam to expand. Thus, when the beam emerges into the air at the end of the end cap, it is much larger in diameter than at the point 45a at the end of the single mode fibre and therefore the power density at the silica/air interface 46a is much lower than at the fibre tip 45a. This helps to prevent damage due to the presence of dust or other contaminants on the face. A further advantage is that the lower power density allows the use of an antireflection coating (not shown) on the face. Typically, the capillary tube may be of diameter around 2,000 μm for a fibre of typical core diameter of around 10 microns or less.

Figure 5:
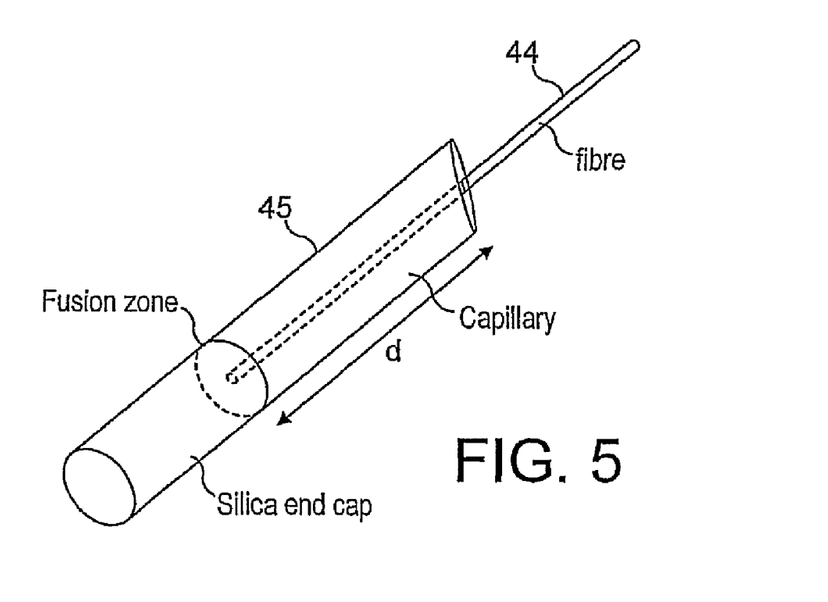
FIG. 5 shows an alternative end cap.

In an alternative embodiment, in order to increase the mode size, a larger silica end cap may be fused onto the assembly, as is shown in FIG. 5. As shown, in this embodiment, the end of the delivery fibre is inserted into the capillary tube and fused into the capillary tube so that the outer diameter of the fibre is joined to the bore of the capillary tube for a distance D of few millimetres. Again, the capillary tube has an angled face typically of 49° (which is the angle at which total internal reflection occurs between a glass/air interface). The end of the capillary is then prepared for attachment of an end cap 50 by polishing cleaving or other suitable method. An end cap 50 of silica or other material, equal in diameter to the outside diameter of the capillary tube is then fused to the end of the capillary and fibre assembly. The end cap is therefore generally cylindrical having an end typically at 90° to the longitudinal axis of the fibre/capillary assembly and of equal diameter to the capillary. This further increases the mode size.

The typical spot size at the output may be 0.01 to 1 mm and the length of the end cap might typically be around 10 mm. This could be used for a typical laser output power of between around 10 W to around 2 KW. The typical intensity at the end of the end cap, for an output of 2 KW and spot size of 1 mm will be around 250 $KW/cm^2$. This can result in a typical intensity reduction through the use of an end cap of around 1,000 times. The output face of the end cap may be flat polished and possibly may have an anti-reflection coating at the lasing wavelength.

In construction of the FIG. 4 embodiment, a pure silica rod of the same or greater outside diameter as the single mode fibre is first spliced to the end of the fibre (as in FIG. 4). The capped fibre is then inserted into a capillary and the rod and the first few millimetres of the fibre are then fused into the capillary bore as shown in FIG. 4. The output end of the fibre/end cap/capillary assembly is then polished, cleaved or otherwise processed to achieve a good optical surface. The end cap 46 is fused with the inner bore of the capillary as shown in the fusion zone F. Provided the fusion of the rod and the capillary in the zone F results in an optically clear interface, then it is seen that this construction is optically equivalent to the use of a larger elongated end cap.

The termination/end cap disclosed may have applications beyond fibre lasers.

Figure 6:
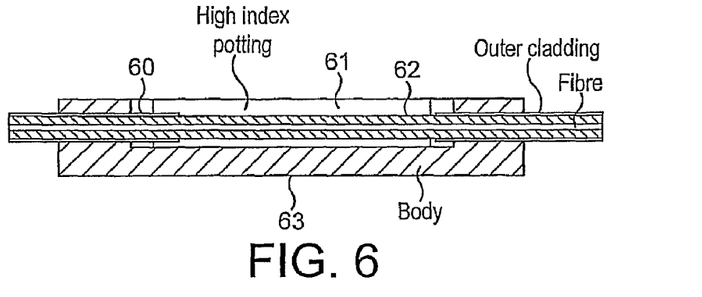
FIG. 6 shows a cladding mode stripper.
Figure 7:
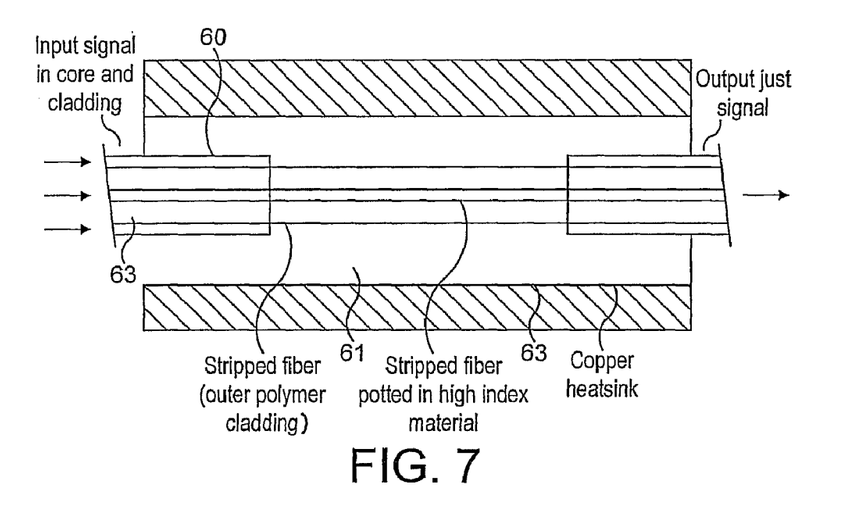
FIG. 7 shows a cladding mode stripper in more detail.

A cladding mode stripper is shown in FIG. 6 and FIG. 7. The transmission fibre, after the output from the laser itself, includes a core and at least two layers of cladding, one of which may be an outer polymer cladding. A cladding mode stripper is applied over part of this fibre, at a part which has been stripped of its outer polymer cladding 60. The fibre, including the portion stripped of its outer polymer cladding, is potted in a high refractive index material 61. This results in a large proportion of any stray radiation which is being guided in the cladding layers 62, 60 being stripped out into the high index material 61, typically of index Np=1.55, compared to cladding indices of 1.46. A heat sink body 63, typically of a conductive material such as copper or aluminium, can then be used effectively to draw this heat away. That is, the light which finds its way into the potting material is then dumped into the conductive heat sink and is safely removed.

FIG. 7 shows schematically the cladding mode stripper in a little detail and shows an input signal which includes radiation in both the core and cladding layers and an output signal, after the cladding mode stripper, which comprises just signal within the core.

In the fibre laser assembly of FIGS. 1 and 2, one or more cladding strippers may be applied at positions spaced along the fibre. In typical examples, the polymer coating material of the fibre has a refractive index of 1.56. The typical length of a cladding stripper for a fibre of 400 μm in diameter is around 50 mm. For a fibre of around 125 μm the typical length of the diameter may be around 25 mm. In the arrangement as shown, is typically efficient at removing greater than 99% of power transmitted within the cladding layer of the fibre.

As shown in FIGS. 1 and 2, the fibre laser also preferably includes one (or advantageously more than one) power monitor to monitor the health of the system. This or these are located in the delivery fibre after the final Bragg grating. Most advantageously, two or more monitors are used to enable fault diagnosis of possible damage in the delivery fibre. If two power monitors are distributed at different longitudinal positions along the length of the delivery fibre and the ratio of their monitored powers compare then if there a difference between them it is likely to mean that there is damage in the fibre between the power monitors causing loss of signal and thus a fault can be detected. A comparison signal can therefore be used to indicate a fault and this can be used to control equipment to turn the laser OFF before damage occurs to more valuable components.

In a further embodiment the expected output power from the fibre laser can be predicted using, for instance, a calibration look up table of power output vs excitation power to the fibre laser. This predicted value can be compared to the value measured at the power monitor(s) and the laser switched off if there is a discrepancy.

For both of the embodiments described above the length of fibre between the comparative power monitor and the first critical component that is being protected is vital to the protective operation of the system. The optical discharge propagates at a value of up to 10 m/second. The fibre length is chosen to enable the drive electronics, either hardware or software, to respond in time and switch the excitation source off before the optical discharge reaches the critical component.

Figure 8:
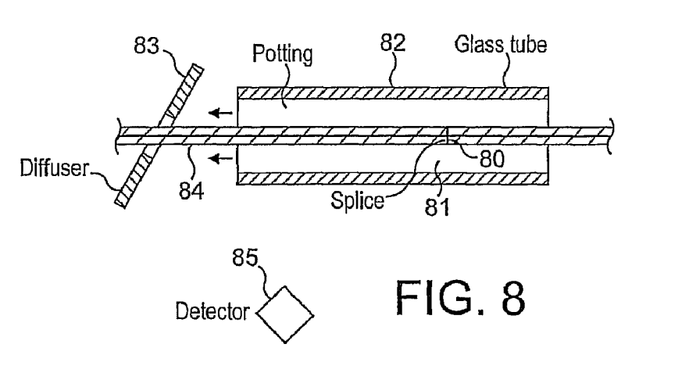
FIG. 8 shows a detector arrangement.

Any suitable power monitoring arrangement may be used. One is shown by way of example in FIG. 8. A splice 80 is formed in the fibre at a point on the delivery end of the system where power monitoring is to occur. The fibre for a distance at either end of the splice is potted in a high refractive index material 81 and sleeved by a glass tube 82. The splice has the effect of releasing stray light which is then released into the high index potting and is steered by the glass tube out of the assembly onto a defusing plate 83. The fusing plate is formed of a plate having a central hole in it to receive the pass through fibre 84. It is of sufficient diameter to capture light steered by the glass tube and to redirect this (ie reflect it) onto a detector 85. The detector is typically a photodiode which generates an output current in proportion to incident light intensity.

Figure 9A:
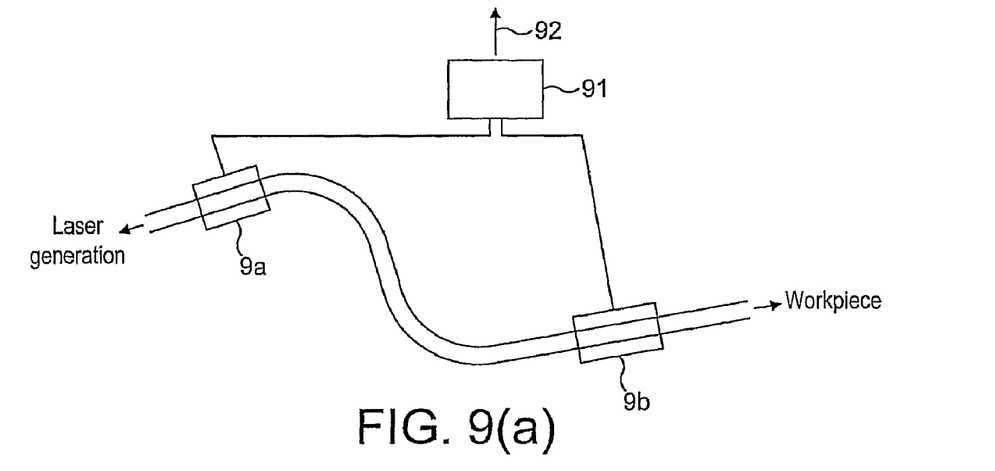
FIG. 9(a) shows a delivery fibre and power monitors.

FIG. 9(*a*) shows schematically a delivery fibre mounted between the laser generating part of the assembly and a workpiece and shows two power monitors 9*a* and 9*b* longitudinally separated along the delivery fibre. The intensity levels detected by these monitors are applied to a comparison unit 91 where they are compared and algorithms are used to determine whether any differences between them arise from natural tolerances and affects or are likely to be faults. If a fault is detected, then a signal 92 may be generated which serves to immediately turn OFF the laser or provide other alerts or warnings or which may simply be recorded. By measuring the power in this manner, at spaced locations along the delivery fibre, very quick indication of possible damage can be made and the laser may be turned OFF before damage occurs to any other components.

Figure 9B:
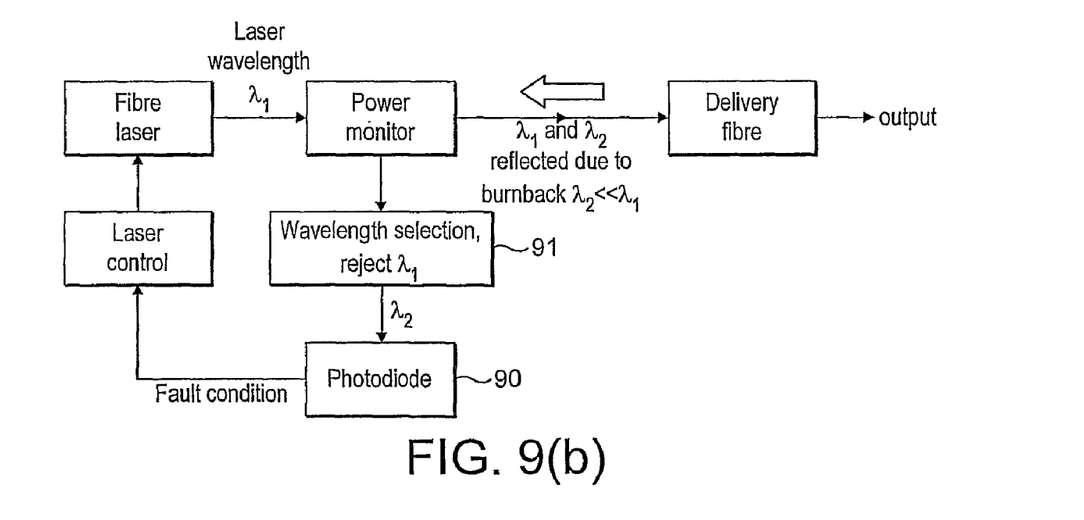
FIG. 9(b) shows an alternative monitoring arrangement.

In a further embodiment of the fibre fuse detect and protect circuitry (shown schematically in FIG. 9(*b*)) a wavelength filtered photodiode (or other photo sensor) system, including a filter 91 and photodiode 90, is included that blocks out the laser radiation wavelength λ1 but passes short wavelengths eg λ2 that are typically generated by the plasma generated in the fibre fuse process (burnback). Detection of these short wavelengths by the photodiode can be used to turn off the power source to the fibre laser.

FIGS. 10 through 14 show embodiments of an annular pump combiner and methods of forming these.

Referring to FIGS. 10(*a*) to 10(*d*), the multiplexer consists of an output optical fibre 2001, a signal feed-through optical fibre 2002, an annular optical waveguide 2003 having a tapered section, and a plurality of multimode pump optical fibres 2004.

Figure 10A:
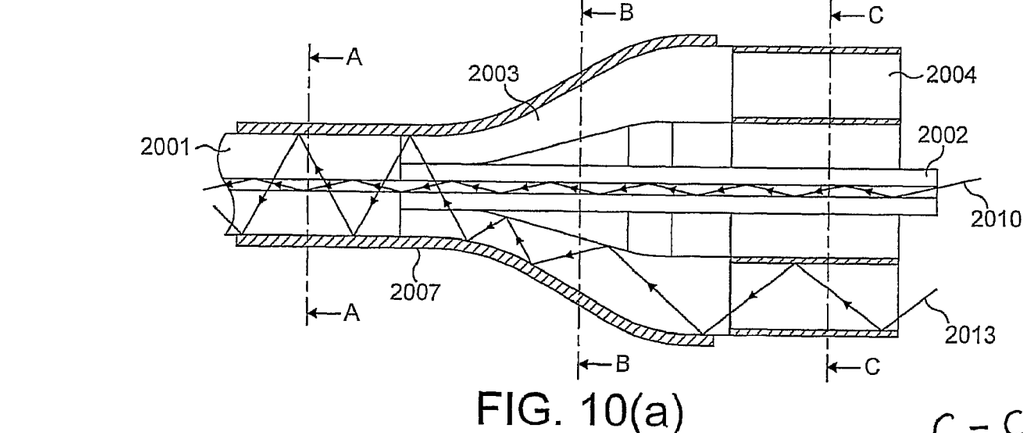
FIG. 10(a) shows a cross-section through a multiplexer/demultiplexer.
Figure 10B:
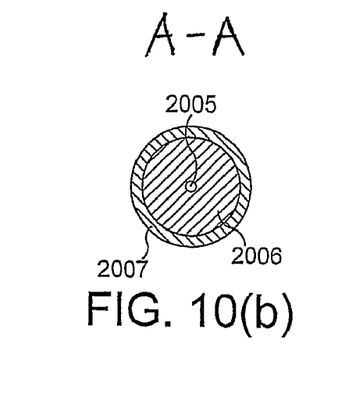
FIGS. 10(b), (c) and (d) show respective cross-sections through A-A, B-B and C-C of FIG. 10(a)
Figure 10C:
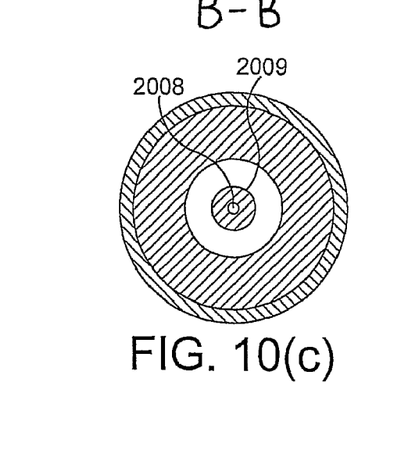
Figure 10D:
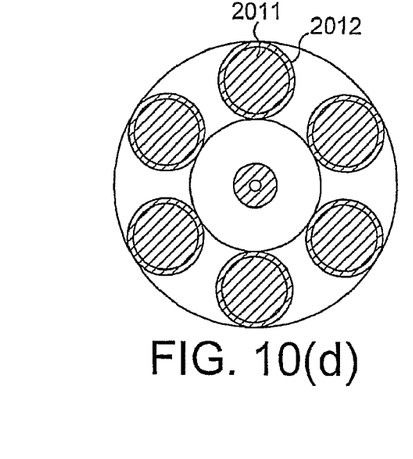
Figure 11A:
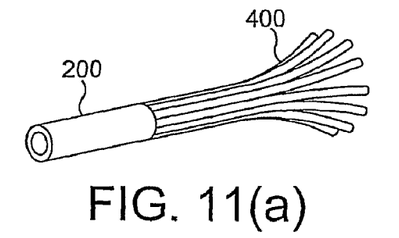
FIGS. 11(a) to (e) show stages in the formation of a device
Figure 11B:
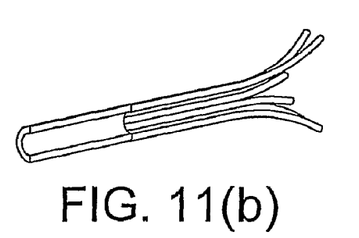
Figure 11C:
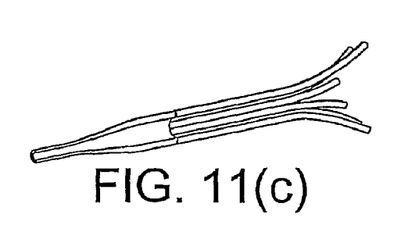
Figure 11D:
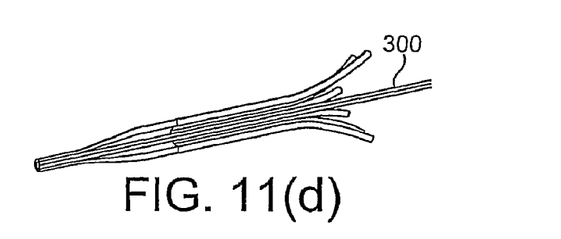
Figure 11E:
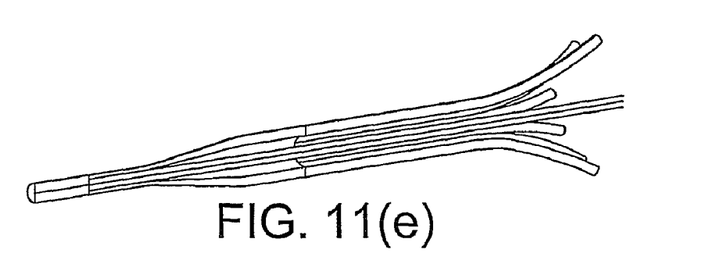

The output optical fibre has a core 2005, a first cladding 2006, an outer cladding 2007 and possibly intermediate cladding layers. The core of the output fibre acts as a waveguide for a laser signal. The cladding layer or layers define a multimode waveguide surrounding and including the core which guides the multimode pump light. The outer cladding layer 2007 could be a low refractive index polymer layer which gives a high numerical aperture for the multimode pump waveguide. By way of an example, the output fibre could be a double-clad fibre with a glass core and first cladding and a polymer second cladding. The diameter of the core could be 20 microns, the diameter of the first cladding could be 400 microns, the numerical aperture of the core waveguide could be 0.06, and the numerical aperture of the multimode waveguide defined by the first cladding and the second cladding could be 0.46.

The signal feed-through fibre 2002 has a core 2008 and a glass cladding 2009 and possibly additional cladding layers. The purpose of the core is to guide a laser signal 2010 through the multiplexer into or out of the core of the output fibre 2005. Ideally, the transverse mode distribution in the core of the feed-through fibre is well-matched to that in the core of the output fibre to ensure efficient coupling of the laser signal from one to the other. By way of an example, the core diameter could be 20 microns, the cladding diameter could be 200 microns, and the numerical aperture of the core waveguide might be 0.06.

The multimode pump optical fibres 2004 typically have a glass core 2011 and a glass cladding 2012. By way of an example, the core diameter could be 105 microns, the cladding diameter 125 microns, and the numerical aperture of the core equal to 0.15. When using the multiplexer as part of a fibre laser system, the optical output of a semiconductor laser diode would be optically coupled into the core at the free end of the pump fibre.

The annular waveguide 2003 is a glass optical waveguide and it is employed as an intermediate section between the multimode pump fibres and the output fibre. It has a tapered section. The purpose of the annular waveguide is to guide the multimode pump light 2013 from the multimode optical fibres into the cladding of the output fibre. In one embodiment the annular waveguide could be a silica glass capillary having a circular cross-section. By way of an example, the inner diameter of the capillary in the un-tapered section could be 600 microns and the outer diameter 1100 microns. In the tapered section of the annular waveguide, the inner diameter is similar to but slightly larger than the outer diameter of the signal feed-through fibre. In the present example, that might be 205 microns. The outer diameter of the annular waveguide in the tapered section is determined geometrically according to the tapering ratio. In this example it would be 375 microns. The degree of tapering of the annular waveguide is limited by geometrical optics considerations. According to the brightness theorem, when light propagates in a tapered waveguide, the angle of the rays of light in the core increases with respect to the axis of the waveguide. The theorem states that the square of the ray angle increases in inverse proportion to the cross-sectional area of the tapered waveguide. For an optical fibre to guide a ray of light by total internal reflection, the ray angle must be lower than the numerical aperture of the fibre, which is a function of the refractive indices of the core and the cladding. If the ray angle exceeds the numerical aperture then the ray will escape from the core into the cladding. In a typical embodiment of the present invention, the object is to couple the multimode pump light exiting the tapered end of the annular waveguide into the first cladding of the output optical fibre, and for this first cladding to guide the pump light by total internal reflection at the interface with the second cladding. Therefore, the ray angle at the output of the tapered angle waveguide must not exceed the numerical aperture determined by the refractive indices of the first and second claddings of the output fibre, which in the present example is 0.46. As described above, the output ray angle is determined by the input ray angle and the degree of tapering of the waveguide. In the present example, the maximum input ray angle is approximately 0.15, determined by the numerical aperture of the multimode pump optical fibre. The output ray angle should not exceed the numerical aperture of the output fibre pump waveguide which is 0.46 as described previously. According to the brightness theorem, the maximum degree of tapering of the linear dimensions of the annular waveguide is therefore approximately 0.46/0.15 which is roughly equal to 3.

FIGS. 11(a) to (e) show steps in the construction of a schematic device.

Figure 12A:
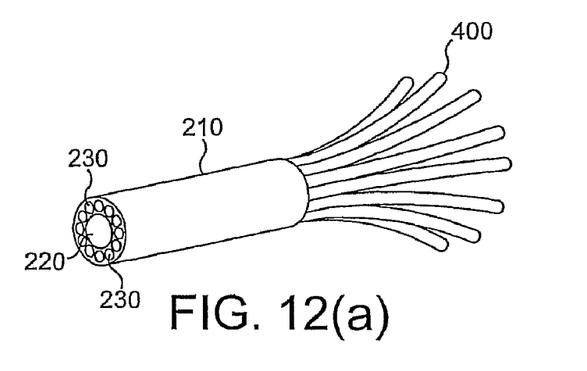
FIGS. 12(a) to (b) show stages in the formation of an alternative device that makes use of a multi-bore capillary FIGS. 13(a) and (b) show a sections through a multi-bore capillary having two layers of pump fibres.
Figure 12B:
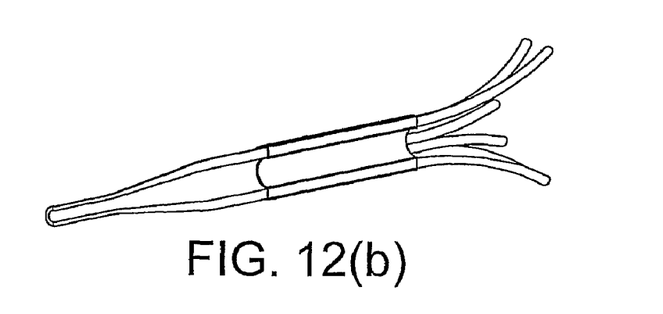

The device is constructed by coupling the outputs of multimode pump fibres (400) into the un-tapered end of an annular waveguide (200), for example by fusion splicing. A signal feed-through fibre (300) is inserted into the annular waveguide and the annular waveguide is heated in the tapered section and collapsed on to the signal feed-through fibre to form an additional cladding layer of the feed-through fibre. This fused section is cleaved and joined onto the output optical fibre, for example by fusion splicing (FIG. 11(e)). The resulting assembly might be recoated with a polymer to improve the strength of the assembly and/or to provide an additional cladding layer. A laser signal can be coupled into or out of the core of the output fibre via the core of the feed-through fibre. Multimode pump light is coupled into the free ends of the pump fibres. It propagates through the tapered annular waveguide (FIG. 12) and into the cladding of the output optical fibre.

In a second embodiment, it is recognised that in some cases of practical interest it may not be straightforward to fusion splice a large number of pump multimode fibres directly onto the end of a capillary as described in the first embodiment. Therefore, in a second embodiment a multi-bore capillary 210 is employed as an aid to fixing the fibres in place and joining them to the capillary.

The multi-bore capillary has a central bore 220 having a diameter sufficiently large for the signal feed-through fibre to pass through it. It also has multiple holes 230 running axially along its length that are intended to receive the plurality of multimode pump fibres.

In the assembly of the device, the plurality of multi-mode pump fibres are inserted into the plurality of axial holes in the multi-bore capillary, and the resulting assembly is fused into a monolithic glass structure by heating. At this point, the plurality of multimode fibres are easy to manipulate as a single unit, and they can be joined to the annular waveguide by fusion splicing more easily than in the first embodiment.

The other aspects of this embodiment such as the tapered annular waveguide, the signal feed through fibre, and the output fibre are as described in the first embodiment.

By way of an example that is consistent with the figures quoted in the first embodiment, the multi-bore capillary might have a central bore with a diameter of 500 microns, an outer diameter of 1400 microns, and the number of axial holes for the pump fibres could be 20, evenly spaced in a circle around the axis of the capillary at a distance of 1000 microns from the axis. The diameter of the axial holes might be 128 microns.

In a preferred embodiment, the annular waveguide is constructed predominantly out of fused silica having one or more fluorine-doped silica layers. These layers might be on the inner, outer or both surfaces and serve several purposes, including aiding the construction of the device and providing desirable optical properties, since fluorine doping reduces both the melting point and the refractive index of the glass. By way of example, the capillary might have an outer diameter of 320 microns and an inner diameter of 256 microns and it might have fluorine doped silica layers on the inner and outer surfaces having a thickness of 10 microns. The refractive index of fused silica at 1064 nm is around 1.45 and the fluorine doped silica might be doped to have a refractive index of around 1.433. It could also be constructed out of some other composite glass composition including elements such as germanium, boron, aluminium, or phosphorous. Optically, the fluorine doped layers act as a low refractive index cladding layer. Stray radiation may be totally internally reflected by this layer and thereby confined to the feed-through fibre providing additional pump isolation. In this case the fluorine doped layer is an alternative to the pedestal or triple clad structure in the feed-through fibre. Mechanically, the softer fluorine doped glass may be advantageous in the construction of the device. Specifically, the interface between the outer fluorine doped layer on the capillary and the fluorine-doped cladding layer on the pump fibres increases the strength of the device.

The annular waveguide preferably has perfectly circular inner and outer cross-sections. However, the annular waveguide need not have perfectly circular inner and/or outer cross-sections. The annular waveguide could also have a polygonal or shaped inner and/or outer cross-section and remain within the spirit of this invention.

The core of the signal feed-through fibre might have waveguide properties such that it supports a single transverse mode, a few transverse modes, or multiple transverse modes. It might also be a photonic crystal core that has a number of holes running axially along its length.

One application of the optical fibre multiplexer is for pumping an optical fibre amplifier or laser. In this arrangement, the output fibre of the multiplexer might have a rare-earth doped core, or the output fibre would be subsequently joined to an optical fibre having a rare earth doped core. In the case of a laser, the output fibre might additionally incorporate wavelength selective components e.g. gratings. Such an amplifier or laser may be pumped from a single end or from both ends.

Figure 13A:
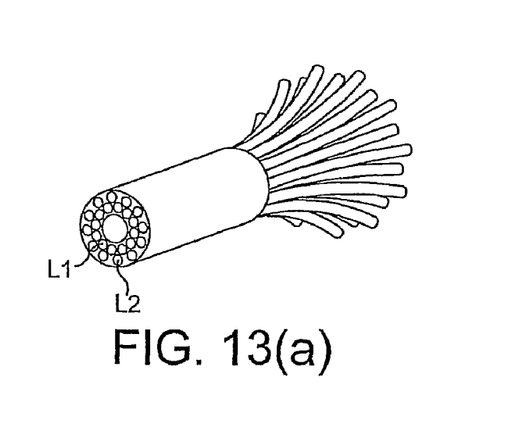
Figure 13B:
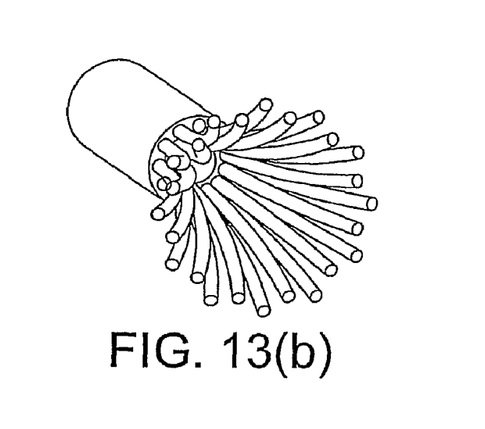
Figure 14A:
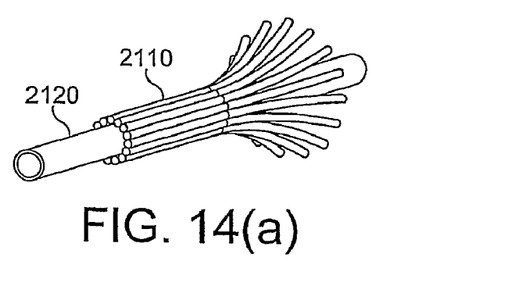
FIGS. 14(a) to (e) show stages in the formation of an alternative device.
Figure 14B:
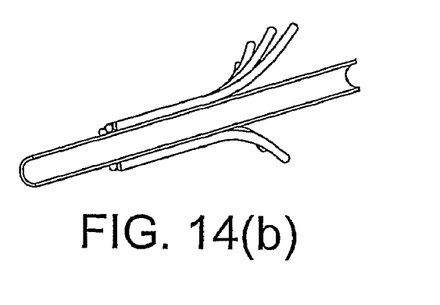
Figure 14C:
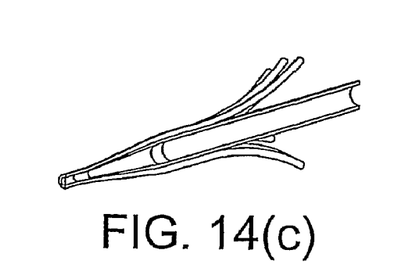
Figure 14D:
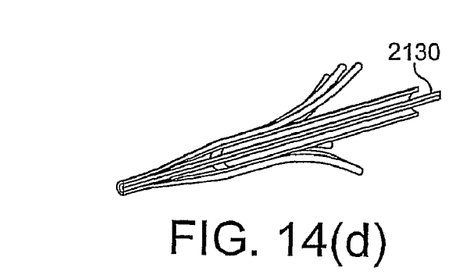
Figure 14E:
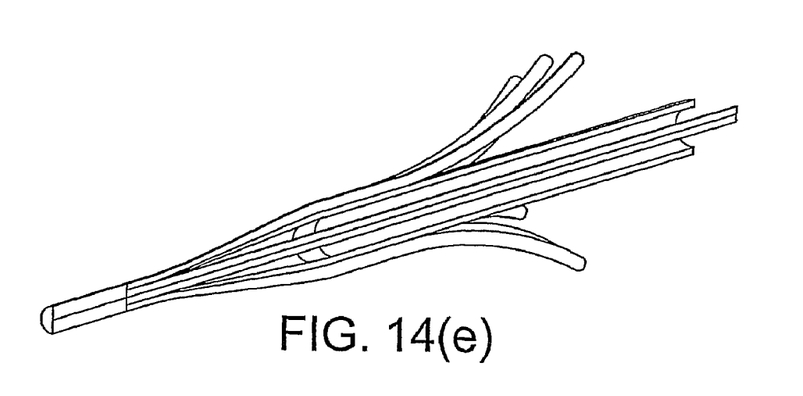

Note that in some embodiments of the invention, the pump combiner might have multiple layers of pump fibres for the purpose of increasing the amount of pump power coupled into the cladding-pumped fibre by the device. FIGS. 1(a) and (b) show an example having two layers $L_1$, $L_2$. There may of course alternatively be just one layer or more than two layers.

FIG. 14(a) to 14(e) shows a further embodiment.

In this embodiment, a bundle of multimode fibres 2110 is wrapped around a tubular (preferably circular) former 2120. They may helically wrapped, longitudinally wrapped or otherwise wrapped. The cylindrical former FIG. 5(b) shows a longitudinal cross section through the assembly. The former and wrapped multimode fibres are then fused and tapered down (FIG. 5(c)) to an inner diameter that is larger than a signal fibre 2130 (FIG. 5(d)) which is then inserted into the fused and tapered assembly. The fused and tapered assembly forms a tapered annular waveguide. The signal fibre 2130 is then inserted into the tapered assembly and is fused onto the signal fibre. As described above, the fact that tapering occurs before the signal fibre is introduced means that very little, if any, deformation of the signal fibres occurs and this is advantageous for the reasons given. This can then be cleaved and then spliced to an output fibre.

The invention claimed is:

1. A fibre laser system comprising;
a feed through optical fibre including a core, a gain part of which is doped with a rare earth material to form an optical gain medium;
at least one laser diode;
pump combiner means for applying pump radiation from the laser diode to the optical gain medium and for generating a laser beam, said pump combiner means including at least one pump waveguide including a plurality of multi-mode pump fibres that are radially separated from the core, wherein the pump waveguide includes an annular-shaped tapered section that is fused to a substantially un-tapered or un-tapered feed through optical fiber and thereby becomes a cladding layer of the feed through optical fiber, and the pump waveguide includes an un-tapered section wherein the multi-mode pump fibres are optically coupled to a portion of the feed through optical fibre that includes the gain part;
at least three cladding layers for protecting radiation from within the optical gain medium from damaging the laser diode; and
delivery fibre means for delivering a laser beam to a workpiece, said delivery fibre means including an output section of the laser fibre system that is optically coupled to the gain part of the optical fibre.

2. A fibre laser system as claimed in claim 1, including a termination which expands the beam before it is launched in free space.

3. A fibre laser system as claimed in claim 2, wherein the termination includes a capillary having an end closest to the laser generating end of the fibre and which is angled at an angle other than 0 or 90° to the longitudinal axis of the fibre.

4. A fibre laser system as claimed in claim 3, wherein the angle is 49°.

5. A fibre laser system as claimed in claim 1, including an end cap of enlarged diameter or enlarged end diameter.

6. A fibre laser system as claimed in claim 5, wherein the end cap is mounted inside the bore of the capillary in such a way as to provide an optically clear interface.

7. A fibre laser system as claimed in claim 5, wherein the end cap has a diameter equal to or greater than the diameter of the capillary and is fused onto the end of the capillary.

8. A fibre laser system as claimed in claim 1, wherein said system includes at least one cladding mode stripper, each of which comprises a portion of the delivery laser delivery fibre having at least one outer cladding layer removed, a material of higher refractive index in contact with the stripped portion, and a heat sink in contact with the high index material.

9. A fibre laser system as claimed in claim 1, including two or more power monitors longitudinally spaced along a delivery part of the fibre laser and means for comparing monitored power to determine a fault.

10. A fibre laser system as claimed in claim 1, wherein said pump combiner is formed by tapering the pump waveguide prior to introducing a signal feed through fibre (including the doped region) within the pumped waveguide so that there is little or no tapering of a signal feed through fibre.

11. A fibre laser system as claimed in claim 10, wherein the annular pump combiner is formed by using a former or a multi-bore capillary.

12. The device fibre laser system of device of claim 1, where the output of the plurality of multimode pump fibres is coupled into the end of the annular pump waveguide.

13. The fibre laser system of claim 1, wherein the plurality of multimode pump fibres are arranged circumferentially around a hollow former, and the multimode fibres and former are fused together and tapered to form the tapered annular waveguide.

14. The fibre laser system of claim 1, where the output fibre is a multi-clad optical fibre.

15. The fibre laser system of claim 1, where the output fibre is a doped optical fibre.

16. The fibre laser system of claim 1, including a plurality of layers of pump fibres.

17. A fibre laser comprising an optical fibre including a core, a gain part of which is doped with a rare earth material to form an optical gain medium, at least one laser diode, pump combiner means for applying pump radiation from the laser diode to the optical gain medium and for generating a laser beam, said pump combiner means including at least one pump waveguide including a plurality of multi-mode pump fibres that are radially separated from the core, wherein the pump waveguide includes an annular-shaped tapered section that is fused to a substantially un-tapered or un-tapered feed through optical fiber and thereby becomes a cladding layer of the feed through optical fiber, and the pump waveguide includes an un-tapered section wherein the multi-mode pump fibres are optically coupled to a portion of the feed through optical fibre that includes the gain part, a delivery fibre for delivering a laser beam to a workpiece, a fibre termination causing the laser beam to expand beyond the size of the fibre before it is launched into free space, and at least one power monitor for use in indicating a fault condition.

18. A fibre laser as claimed in claim 17, wherein the laser comprises the pump combiner is annular-shaped and wherein said fibre laser further includes a feed through fibre having a multi-clad structure for containing radiation within the feed through fibre.

19. A fibre laser as claimed in claim 17, wherein the doped gain fibre has a multi-clad structure.

20. A fibre laser as claimed in claim 17, including at least two power monitors for monitoring the power at two or more positions in the fibre delivery path, and for using the monitored power to detect a fault.

21. A fibre laser as claimed in claim 17, wherein two or more power monitors are provided, spaced apart longitudinally along the delivery fibre and including means for comparing their outputs to determine fault.

22. A fibre laser as claimed in claim 17, wherein said power monitor includes a wavelength filtered photo sensor apparatus adapted to block the laser radiation wavelength but to pass other selected wavelengths, and means for detecting said selected wavelength radiation to determine a fault or critical condition and turn off the laser.

23. A fibre laser as claimed in claim 22, wherein the photo sensor comprises a photodiode apparatus.

24. A fibre laser as claimed in claim 17, including a termination including a capillary having an angled face.

25. A fibre laser as claimed in any claim 24, wherein the termination includes an end cap fused to the end of the capillary or fused within the bore of the capillary.

26. A fibre laser system comprising:
  an optical fibre including a core, a gain part of which is doped with a rare earth material to form an optical gain medium;
  at least one laser diode;
  pump combiner means for applying pump radiation from the laser diode to the optical gain medium and for generating a laser beam, said pump combiner means including at least one pump waveguide including a plurality of multi-mode pump fibres that are radially separated from the core, wherein the pump waveguide includes an annular-shaped tapered section that is fused to a substantially un-tapered or un-tapered feed through optical fiber and thereby becomes a cladding layer of the feed through optical fiber, and the pump waveguide includes an un-tapered section wherein the multi-mode pump fibres are optically coupled to a portion of the feed through optical fibre that includes the gain part;
  at least two cladding layers for protecting radiation from within the optical gain medium from damaging the laser diode;
  at least one power monitor for use in indicating a fault condition; and
  delivery fibre means for delivering a laser beam to an end-cap termination, said end-cap termination for reducing damage to the optical fibre.

* * * * *

UNITED STATES PATENT AND TRADEMARK OFFICE
CERTIFICATE OF CORRECTION

PATENT NO. : 7,839,902 B2  Page 1 of 1
APPLICATION NO. : 12/341314
DATED : November 23, 2010
INVENTOR(S) : Cheng Li et al.

It is certified that error appears in the above-identified patent and that said Letters Patent is hereby corrected as shown below:

On the Title page, please add:
Item "(30)    Foreign Application Priority Data
Jun. 23, 2006   (GB)    0612463.0
Nov. 24, 2006   (GB)    0623452.0
Jun. 13, 2007   (GB)    0711375.6"

In the Specifications:
In Column 1, line 3, please add:
"Priority
The present application is a continuation application of PCT/GB2007/050335 filed June 14, 2007, which claims priority to United Kingdom Patent Application No. 0612463.0 filed June 23, 2006, and claims priority to United Kingdom Patent Application No. 0623452.0 filed November 24, 2006, and claims priority to United Kingdom Patent Application No. 0711375.6 filed June 13, 2007, the disclosures of all of which are hereby incorporated by reference."

Signed and Sealed this
Twenty-fifth Day of January, 2011

David J. Kappos
*Director of the United States Patent and Trademark Office*